UNITED STATES PATENT OFFICE.

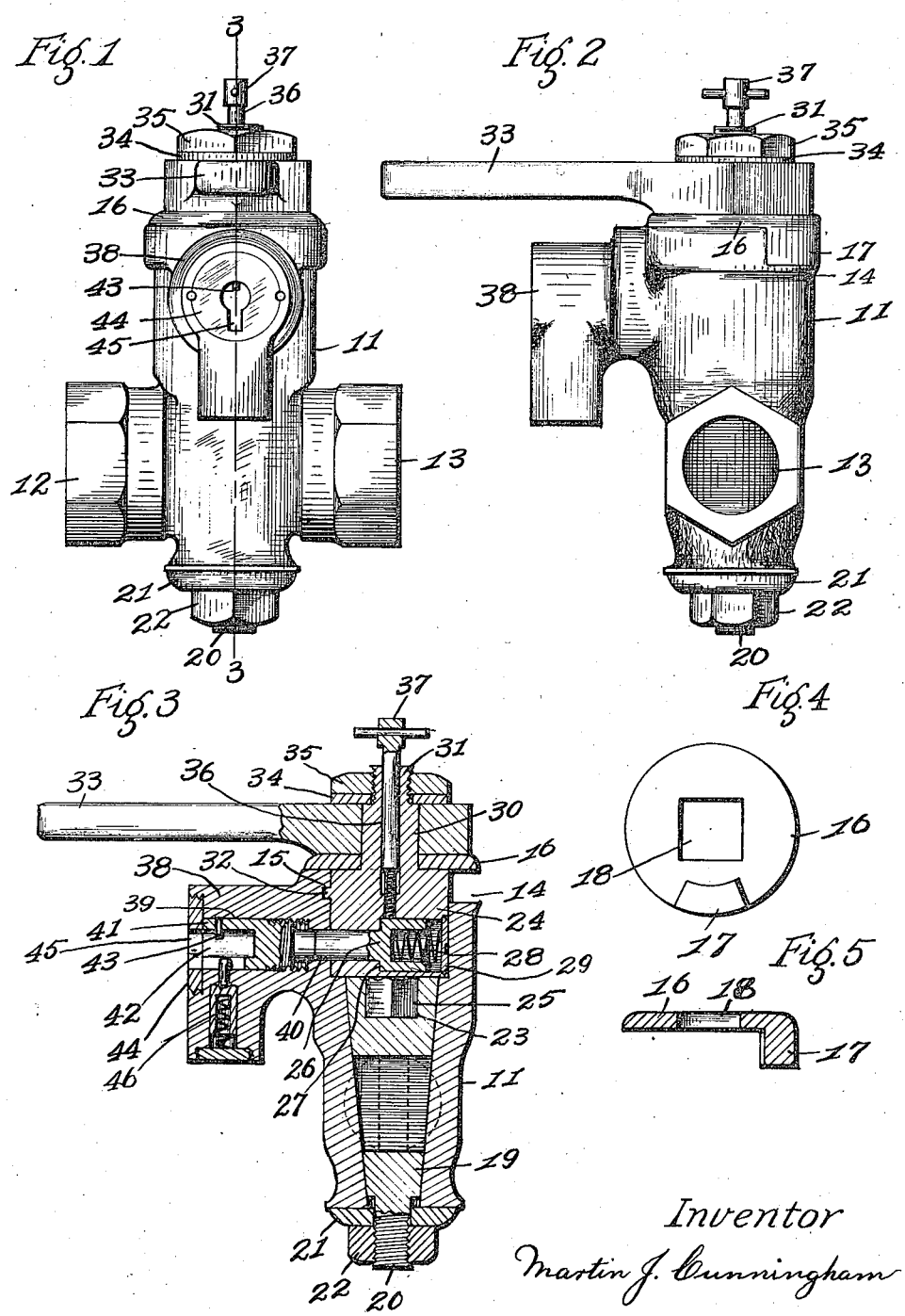

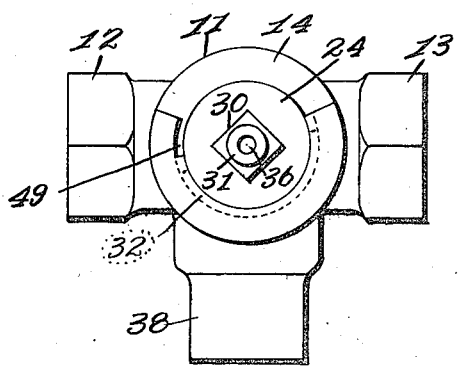
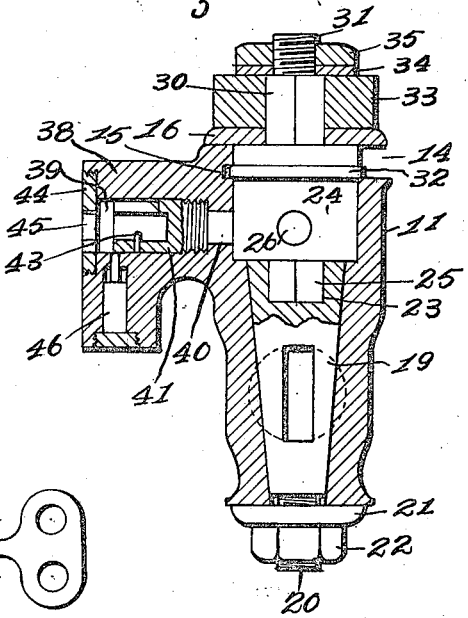
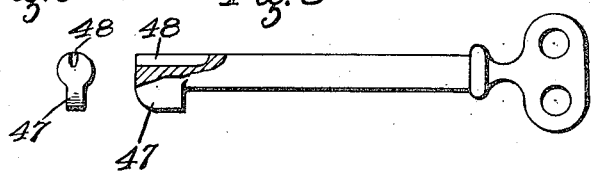
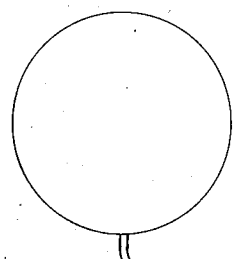
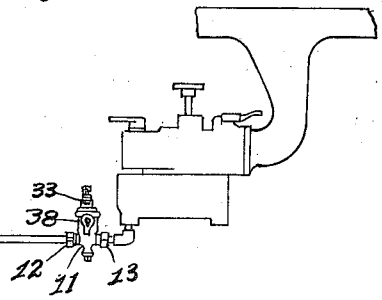

MARTIN J. CUNNINGHAM, OF SPRINGFIELD, MISSOURI, ASSIGNOR OF ONE-HALF TO EMALINE B. CUNNINGHAM, OF SPRINGFIELD, MISSOURI.

LOCK-VALVE.

1,275,135.

Specification of Letters Patent.

Patented Aug. 6, 1918.

Application filed October 18, 1917. Serial No. 197,229.

*To all whom it may concern:*

Be it known that I, MARTIN J. CUNNINGHAM, a citizen of the United States, and resident of Springfield and State of Missouri, have invented certain new and useful Improvements in Lock-Valves, of which the following is a specification containing a full, clear, and exact description, reference being had to the accompanying drawings, forming a part thereof.

My invention relates to certain new and useful improvements in lock valves, and has for its object the construction of a lock valve, wherein the valve may be adjusted to take up the wear and tear and the valve may be set if desired in an unlocked position and also the provision of a guard for the key opening to prevent the unlocking of the valve without the proper key.

In the drawings,

Figure 1 is a front view of my improved lock valve disconnected.

Fig. 2 is a side or end view.

Fig. 3 is a longitudinal section taken on a line 3—3 of Fig. 1.

Fig. 4 is a bottom plan view of a locking plate or washer which I employ to limit the rotation of the valve handle.

Fig. 5 is a sectional view of the same.

Fig. 6 is a top plan view of my improved valve with certain parts removed.

Fig. 7 is a longitudinal sectional view similar to Fig. 3 with parts removed showing the valve unlocked.

Fig. 8 is a view illustrating the key which I employ to unlock the valve.

Fig. 9 is an end view of same, and

Fig. 10 is a diagrammatical view showing my improved lock valve in use on an automobile, the same being located between the fuel tank and the carbureter.

Referring by numerals to the accompanying drawings, 11 indicates the valve casing, and 12 and 13 indicate the inlet and outlet.

The valve casing 11 is open at the top and is provided with a cutaway or recessed portion 14 throughout a portion of its circumference, and with an internally formed recess or groove 15.

The top of the casing is adapted to be closed by means of a plate 16, provided with a depending lug 17, which is located in the cutaway portion 14, and with an angular opening 18. Mounted in the lower part of the casing is a cone valve 19, provided with a screw threaded stud 20, on which there is mounted a washer 21, and nut 22, and by means of the nut 22, the valve 19 may be adjusted to take up the wear and tear on same.

Formed on the upper end of the valve 19 is an angular depression or socket 23. Mounted in the upper end of the casing is a cylindrical plug 24, provided on its lower end with an angular projection 25, which is adapted to fit into the angular socket 23 of the valve.

The valve 19 and cylindrical plug 24 are separate and the valve 19 may be adjusted to take up the wear and tear independently of said plug.

Seated in the plug 24 is a spring held plunger 26, provided with a shoulder 27. Said plunger 26 is located in the plug 24 by means of suitable bores or openings in which it is located and is spring seated on a spring 28, one end of said spring being seated on a screw threaded cap 29, inserted in the plug.

Formed on the upper end of the plug 24 is an angular projection 30, provided with a screw threaded end 31. When the valve is assembled the angular projection 30 is located in the angular recess 18 of the cap or plate 16.

Formed on the plug 24 and extending about one half of its circumference is a rib 32 which is adapted to be seated in the groove 15 of the valve casing, and when said rib is seated in said groove the plug cannot be removed, and in order to remove the plug it is turned until the rib clears and coincides with the cutaway portion 14 of the valve casing.

In Fig. 3 I have shown the plug and valve in a locked position and in Fig. 7 I have shown them in an unlocked position. By the connection between the valve 19 and plug 24, the locking of the plug controls the locking of the valve, because when the plug turns the valve will be rotated or turned.

33 indicates a handle by means of which the plug 24 and consequently the valve 19 is manipulated. Said handle is mounted on an angular stud 30, and is secured in place by means of a washer 34 and nut 35.

Formed in the plug 24 is a vertical bore 36, the lower end of which is screw threaded, and mounted in said bore 36 is a pin 37, having its lower end screw threaded. The function of this pin is to hold the plunger 26 in a set position, or in position in which the plug 24 is unlocked and permitted to rotate without locking, if desired.

Formed on the casing 11 is an integral laterally extended casing 38, said casing is provided with a bore 39 the inner end of which is screw threaded, said bore terminating in a reduced bore 40 which coincides with the bore formed in the plug 24, in which the spring pressed plunger 26 is located. When the plug 24 is locked or prevented from rotating, the plunger 26 is seated in the bore 40.

Mounted in the bore 39 is a plug 41, said plug being provided on its lower end with screw threads adapted to engage with the threads in the inner end of the bore and is provided with a cavity 42 into which projects a stud 43.

The bore in the casing 38 is inclosed by a screw threaded plate 44, provided with a key opening 45.

46 indicates a spring seated plug which is adapted to project into the cavity 42 and acts as a guard for the key hole opening.

In Figs. 8 and 9 I have illustrated the key for unlocking the valve, said key being provided with a curved wing 47, and with a slot 48.

In the operation of unlocking the valve or unlocking the plug 24 so that it will rotate, the key is introduced into the key hole opening 45, and the rounded wing thereon will press down the spring plunger 46 and permit the key to pass into the cavity 42, the lug 43 being seated in the slot 48 of the key. By turning the key the plug 41 will be screwed inwardly and the inward movement of the plug will unseat the plunger 26, and when in proper position the plug 24 may be rotated by means of the handle 33 and consequently the valve 19.

As previously pointed out it is the locking and unlocking of plug 24, which controls the valve 19.

It will be observed from Fig. 6 that a portion of the upper wall of the groove or recess 15 is cut away as illustrated at 49, for the purpose of permitting the rib 32 on the plug 24 to pass and to be seated in groove 15. In other words, the length of the rib 32 is greater than the cut away portion 14, but it is of approximately the same length as the cut away portion 14 plus the portion cut away at 49.

By this construction the plug 24 when it is unlocked may be removed from the case. In order to seat the plug 24 in the casing it is only necessary to press in the plunger 26 until it clears the wall of the casing.

When the plug 24 is locked and consequently the valve 19, it will be observed that the rib 32 is seated in the groove or recess 15, and cannot be removed by a wrench or other tool even if the operating handle is removed.

It will be observed that the valve 19 and plug 24, as it were, constitute a sectional valve, which are rotated or moved together in opening and closing the valve and as previously stated the valve 19 may be adjusted independently of the plug 24. In other words, the sections of the valve (valve 19 and plug 24) rotate together, and are adjustable to and from each other.

My improved lock valve may be used for any purpose and is especially adaptable for use on automobiles as illustrated in Fig. 10 wherein the lock valve is shown between the fuel tank and the carbureter, and by its use the supply of gasolene may be cut off, by locking the valve.

Furthermore my improved valve may be used on a faucet and the valve locked to control the flow of any fluid.

The lug 17 carried by the plate 16 is for the purpose of limiting the movement of the operating handle and consequently the rotation of valve 19.

Having described my invention, what I claim is,

1. A lock valve comprising a casing, a sectional valve located in said casing, said sections being adapted to rotate together and to be relatively adjusted, means for rotating one section of the valve, a spring held plunger located in said valve section adapted to be seated in a bore formed in the valve casing, a screw threaded plunger located in the casing adapted to unseat said plunger, and a key for rotating said screw threaded plunger.

2. A lock valve comprising a casing provided with an inlet and an outlet, a valve located therein, a plug seated in and adapted to operate said valve, a spring pressed plunger located in said plug and adapted to be seated in a bore formed in the casing, a screw threaded plug located in the casing, a key for operating said screw threaded plug to unseat the spring pressed plunger, an interlocking connection between the casing and plug to prevent the plug from being removed when locked, and an operating handle mounted on said plug for operating the valve.

3. A lock valve comprising a casing provided with a lateral extension, said extension being provided with a bore, a screw threaded plug mounted in said extension and seated in the bore, said screw threaded plug being provided with a key hole opening and a stud projecting into said key hole opening, a key for operating said screw threaded plug, a plug mounted in said casing seated in and adapted to operate a valve in said casing, a spring pressed plunger mounted in said plug and adapted to be operated by said screw-threaded plug, and a handle for operating said plug.

4. A lock valve comprising a casing, a valve located therein, a rotatable plug mounted in said casing and seated in said valve, a spring pressed plug mounted in the rotating plug and adapted to be seated in a recess formed in the casing, a screw threaded plug mounted in the casing for unseating the spring pressed plug, a handle for rotating the plug mounted in the casing, and a screw threaded stem mounted in said plug for holding the spring pressed plug in a set position.

5. A lock valve comprising a casing, a tapered cut-off valve mounted in said casing, a spring pressed plunger mounted in the valve and adapted to be seated in a bore formed in the casing for locking said valve, a lateral extension provided with a screw threaded bore carried by said casing, a screw threaded plug provided with a key hole opening mounted in said bore for unseating said spring pressed plunger, and a key for operating said screw threaded plug.

In testimony whereof, I have signed my name to this specification, in the presence of two subscribing witnesses.

MARTIN J. CUNNINGHAM.

Witnesses:
RUSSELL A. YOUNG,
D. C. STUTZMAN.